United States Patent
Chase

(10) Patent No.: US 10,489,028 B2
(45) Date of Patent: Nov. 26, 2019

(54) DRAWING A USER'S ATTENTION IN A GROUP CHAT ENVIRONMENT

(71) Applicant: International Business Machines Corporation, Armonk, NY (US)

(72) Inventor: Todd S. Chase, Weston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 503 days.

(21) Appl. No.: 15/063,613

(22) Filed: Mar. 8, 2016

(65) Prior Publication Data

US 2017/0264573 A1    Sep. 14, 2017

(51) Int. Cl.
| | | |
|---|---|---|
| *G06F 3/0484* | (2013.01) | |
| *H04L 12/58* | (2006.01) | |
| *G06Q 50/00* | (2012.01) | |
| *H04W 4/08* | (2009.01) | |
| *G06F 17/28* | (2006.01) | |

(52) U.S. Cl.
CPC ...... *G06F 3/04842* (2013.01); *G06F 3/04845* (2013.01); *G06Q 50/01* (2013.01); *H04L 51/04* (2013.01); *H04L 51/32* (2013.01); *G06F 17/28* (2013.01); *H04W 4/08* (2013.01)

(58) Field of Classification Search
CPC ......... H04L 51/24; H04L 51/04; H04L 51/32; G06F 3/0482
See application file for complete search history.

(56) References Cited

U.S. PATENT DOCUMENTS

| | | |
|---|---|---|
| 7,958,453 B1 | 6/2011 | Taing |
| 2007/0005754 A1 | 1/2007 | Horvitz et al. |
| 2007/0113181 A1 | 5/2007 | Blattner et al. |

(Continued)

FOREIGN PATENT DOCUMENTS

| | | |
|---|---|---|
| WO | 2004049683 A2 | 6/2004 |
| WO | 2007032773 A1 | 3/2007 |

(Continued)

OTHER PUBLICATIONS

IBM: List of IBM Patents or Patent Applications Treated as Related, 2 pg.

(Continued)

*Primary Examiner* — Roland J Casillas
(74) *Attorney, Agent, or Firm* — Cuenot, Forsythe & Kim, LLC

(57) ABSTRACT

A plurality of different group chats in which a first user participates can be hosted. Each group chat includes at least two other users. A request is received from a second user of a first of the plurality of group chats for attention of the first user of the first group chat. Responsive to receiving the request from the second user, a chat client of the first user can be instructed to present a first attention indicator for the first group chat, wherein the first attention indicator signifies that participation of the first user within the first group chat is needed or requested by another user of the first group chat. The first attention indicator instruction is provided only to, and the first attention indicator is presented only by, the chat client of the first user of the first group chat and can persist until cleared by the first user.

10 Claims, 5 Drawing Sheets

(56) References Cited

U.S. PATENT DOCUMENTS

| | | | |
|---|---|---|---|
| 2008/0092063 A1* | 4/2008 | Canfield | G06Q 10/10 715/753 |
| 2013/0097255 A1 | 4/2013 | Appelman et al. | |
| 2013/0262574 A1* | 10/2013 | Cohen | G06F 17/2765 709/204 |
| 2014/0164951 A1* | 6/2014 | Gupta | H04L 12/1827 715/753 |
| 2014/0280603 A1 | 9/2014 | Rideout et al. | |
| 2015/0074202 A1* | 3/2015 | VanBlon | H04L 51/18 709/206 |
| 2017/0255889 A1* | 9/2017 | Jones | G06Q 50/01 |

FOREIGN PATENT DOCUMENTS

| | | |
|---|---|---|
| WO | 2009037530 A2 | 3/2009 |
| WO | 2012135384 A2 | 10/2012 |

OTHER PUBLICATIONS

Chase, T.S., "Drawing a User's Attention in a Group Chat Environment," U.S. Appl. No. 15/582,058, filed Apr. 28, 2017, 32 pages.

Zhao, Q.A. et al., "What's Happening?: Promoting Community Awareness Through Opportunistic, Peripheral Interfaces," [online] In Proc. of Working Conference on Advanced Visual Interfaces, ACM, May 2002 [retrieved Mar. 7, 2016] retrieved from the Internet: <,https://scholar.google.com/scholar?hl=en&q=%22what%27s+happening%3F%3A+promoting+community+awareness+through+opportunistic%2C+peripheral+interfaces%22&btnG=8,as_sdt=1%2C10&as_sdtp=>, pp. 69-74.

"What are Chat Commands and Roles?" [online] Skype and/or Microsoft © 2016, [retrieved Mar. 7, 2016] retrieved from the Internet: <https://support.skype.com/en/faq/FA10042/what-are-chat-commands-and-roles>, 5 pg.

"Internet Relay Chat," [online] Wikipedia, the Free Encyclopedia, Feb. 23, 2016 [retrieved Mar. 7, 2016] retrieved from the Internet: <https://en.wikipedia.org/wiki/Internet_Relay_Chat>, 18 pg.

Chatmania, "Yahoo Messenger Buzz Command (Windows / Mac)," [online] Messengeroo, Jul. 26, 2010 [retrieved Mar. 8, 2016], retrieved from the Internet: <http://www.messengeroo.com/yahoo-messenger/yahoo-messenger-buzz-command-windows-mac/>, 6 pg.

* cited by examiner

500

---

Host a plurality of different group chats in which a first user participates, wherein each group chat comprises at least two other users
505

↓

Receive a request from a second user of a first of the plurality of group chats for attention of the first user of the first group chat
510

↓

Responsive to receiving the request from the second user of the first of the plurality of group chats for attention of the first user of the first group chat, instruct, using a processor, a chat client of the first user of the first group chat to present a first attention indicator for the first group chat by communicating to the chat client an attention instruction, wherein the first attention indicator signifies that participation of the first user within the first group chat is needed or requested by another user of the first group chat, wherein the first attention indicator signifies that participation of the first user within the first group chat is needed or requested by another user of the first group chat, wherein the attention instruction is provided only to, and the first attention indicator is presented only by, the chat client of the first user of the first group chat and persists until cleared by the first user
515

DRAWING A USER'S ATTENTION IN A GROUP CHAT ENVIRONMENT

BACKGROUND

The present invention relates to text based electronic messaging, and more specifically, to group chats.

Text based electronic messaging, which includes instant messaging and text messaging, is a form of electronic communication in which text messages are communicated, in real time, from a user to one or more other users over a network. Typically, users generate and receive instant messages and text messages using a client application installed on a client device. While there are various protocols used by client applications to send and receive instant messages, text messages typically are communicated using the Short Message Service (SMS) protocol. Further, text messaging predominantly is used for mobile communications using smart phones and the like, whereas instant messaging predominantly is used when communicating via a workstation, desktop computer or laptop computer. Nonetheless, both text messaging and instant messaging may be used on either of these types of client devices.

SUMMARY

A system includes a processor programmed to initiate executable operations. The executable operations include hosting a plurality of different group chats in which a first user participates, wherein each group chat comprises at least two other users. The executable operations also can include receiving a request from a second user of a first of the plurality of group chats for attention of the first user of the first group chat. The executable operations also can include, responsive to receiving the request from the second user of the first of the plurality of group chats for attention of the first user of the first group chat, instructing a chat client of the first user of the first group chat to present a first attention indicator for the first group chat, wherein the first attention indicator signifies that participation of the first user within the first group chat is needed or requested by another user of the first group chat. The first attention indicator instruction is provided only to, and the first attention indicator is presented only by, the chat client of the first user of the first group chat and can persist until cleared by the first user.

A computer program includes a computer readable storage medium having program code stored thereon. The program code is executable by a processor to perform a method. The method includes hosting a plurality of different group chats in which a first user participates, wherein each group chat comprises at least two other users. The method also can include receiving, by the processor, a request from a second user of a first of the plurality of group chats for attention of the first user of the first group chat. The method also can include, responsive to receiving the request from the second user of the first of the plurality of group chats for attention of the first user of the first group chat, instructing, by the processor, a chat client of the first user of the first group chat to present a first attention indicator for the first group chat, wherein the first attention indicator signifies that participation of the first user within the first group chat is needed or requested by another user of the first group chat. The first attention indicator instruction is provided only to, and the first attention indicator is presented only by, the chat client of the first user of the first group chat and can persist until cleared by the first user.

BRIEF DESCRIPTION OF THE DRAWINGS

FIG. 5 is a flow chart illustrating an example of a method of presenting a specific attention indicator to a user.

DETAILED DESCRIPTION

Figure 1:
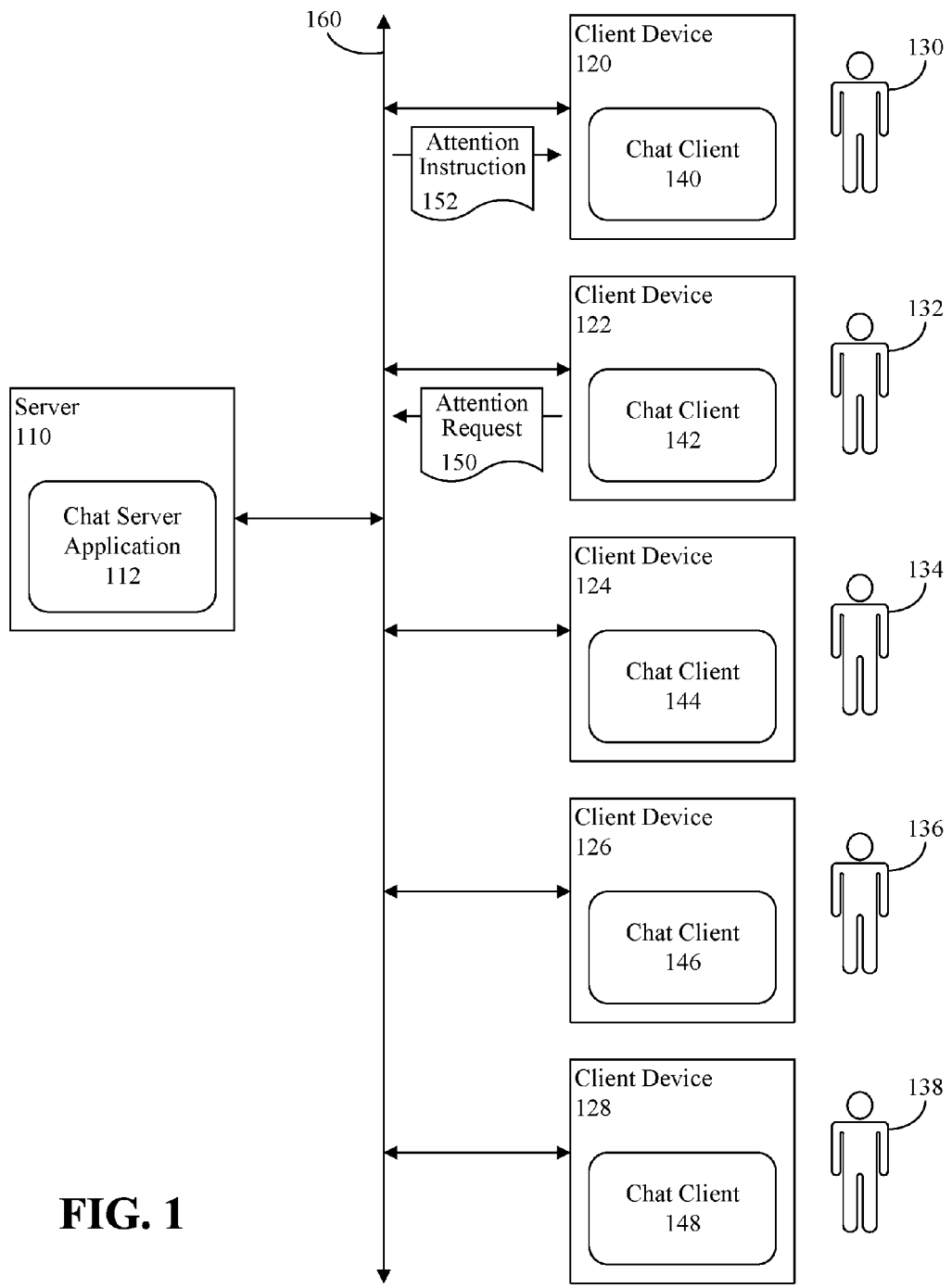
FIG. 1 is a block diagram illustrating an example of a network computing environment.

This disclosure relates to text based electronic messaging, and more specifically, to group chats. In accordance with the inventive arrangements disclosed herein, one or more users participating in a group chat can request an attention indicator to another user. Responsive to receiving the request, a server can instruct a chat client of the other user to present the attention indicator for the group chat. The attention indicator can signify that participation of the other user within the group chat is needed or requested by another user of the group chat. In this regard, the instruction to present the attention indicator can be provided only to, and the attention indicator can be presented only by, the chat client of the other user. The attention indicator can persist until cleared by the other user. Rather than users in the group chat sending new messages to try to draw the other user's attention back to the group chat, the users can initiate presentation of the attention indicator to the other user. Thus, the attention of the other user can be gained, without the other user being inundated with messages.

Several definitions that apply throughout this document now will be presented.

As defined herein, the term "text based electronic message" means an electronic message comprising text that is communicated from a user to one or more other users via at least one communication network. A text based electronic message can be, for example, an instant message or a text message.

As defined herein, the term "chat" means an electronic communication session in which two or more users exchange text based electronic messages using respective processing systems, each respective processing system including at least one processor, and the text based electronic messages are communicated in real time. The electronic communication session need not be limited temporally; time may pass between individual text based electronic messages being generated and sent by various users participating in a chat.

As defined herein, the term "private chat" means a chat in which only two users participate.

As defined herein, the term "group chat" means a chat in which three or more users participate.

As defined herein, the term "real time" means a level of processing responsiveness that a user or system senses as sufficiently immediate for a particular process or determination to be made, or that enables the processor to keep up with some external process.

As defined herein, the term "attention indicator" means an indicator configured to draw the attention of a user. An attention indicator may be presented visually and/or audibly.

As defined herein, the term "general attention indicator" means an attention indicator presented in response to a new message being received.

As defined herein, the term "specific attention indicator" means an attention indicator presented in response to one or more users requesting the attention of another user.

As defined herein, the term "client device" means a processing system including at least one processor and memory that requests shared services from a server, and with which a user directly interacts. Examples of a client device include, but are not limited to, a workstation, a desktop computer, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "server" means at least one processing system including at least one processor and memory that hosts shared services and provides the shared services to a plurality of client devices.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "user" means a person (i.e., a human being).

FIG. 1 is a block diagram illustrating an example of a network computing environment 100. The network computing environment 100 can include a server 110 and a plurality of client devices 120, 122, 124, 126, 128. The client devices 120-128 can be communicatively linked to the server 110 via a communication network 160. The communication network 160 is the medium used to provide communications links between various devices and data processing systems connected together within the network computing environment 100. The communication network 160 may include connections, such as wire, wireless communication links, or fiber optic cables. The communication network 160 can be implemented as, or include, any of a variety of different communication technologies such as a local area network (LAN), a wide area network (WAN), a wireless network, a mobile network, a Virtual Private Network (VPN), the Internet, the Public Switched Telephone Network (PSTN), or the like.

The server 110 can execute a chat server application 112 configured to host group chats in which text based electronic messages (hereinafter "messages") are exchanged among users 130, 132, 134, 136, 138 of the respective client devices 120-128. Each client device 120-128 can execute a respective chat client 140, 142, 144, 146, 148 with which the respective users 130-138 interact to create and send messages to other users 130-138, and view messages received from other users 130-138. The users 130-138 also can use the chat clients 140-148 to initiate the presentation of specific attention indicators to other users specifically requesting their attention.

In illustration, assume that the user 130 is participating in a plurality of group chats, for example a first group chat in which the users 132, 134 also are participating, and a second group chat in which the users 136, 138. When users 130-138 participating in a particular group chat send messages in the group chat, a general attention indicator can be presented to each of the other users 130-138 participating in that group chat to indicate that a new message has in the group chat has been received. Since this may occur frequently, users 130-138 may ignore the general attention indicator Sometimes, though, a user's attention to the group chat, or a particular message in the group chat, may be needed or requested. For example, the user 132 and/or user 134 may need to direct the attention of the user 130 to the first group chat. Either, or both, of the users 132, 134 can request a specific attention indicator be presented to the user 130 to draw the attention of the user 130 to the first group chat, or the particular message in the group chat. For example, the user 132 can interact with the chat client 142 to select the first group chat, or a message in the first group chat, and select a command represented by a menu item to request that that the specific attention indicator be presented to the user. In another arrangement, the user 132 can enter a predetermined text commend into a message dialog of the chat client 142. In yet another arrangement, the user 132 can enter natural language text into the message dialog of the chat client 142. The chat client can apply natural language processing (NLP) and semantic analysis to analyze the text and, based on the analysis, determine that the user 132 desires to draw the attention of the user 130 to the group chat, or the particular message in the group chat.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the chat client 142 to implement NLP and semantic analysis.

In response to the selections of the user 132, receiving the predetermined text command from the user 132, or receiving the natural language text form the user 132, the chat client 142 can communicate to the chat server application 112, via the communication network 160, an attention request 150 that requests the attention of the user 130 to the first group chat or the particular message in the first group chat. Since the attention request 150 is received from the chat client 142 used by the user 132, and generated on behalf of the user 132, the attention request 150 is considered to be received from the user 132.

In another aspect of the present arrangements, the chat client 142 can automatically send the attention request 150 in response to identifying a predetermined condition. For example, the user 132 can access a configuration menu of the chat client 142 and enter one or more user inputs defining the predetermined condition and configuring the chat client 142 to automatically send the attention request 150 in response to the predetermined condition being identified. In illustration, the user 132 may be a team leader, executive, or the like, and may desire that messages sent by the user 132 be indicated with the specific attention indicator. Thus, the user 132 can configure the chat client 142 to send the attention request 150 to each recipient of a new message each time the user 132 sends a new message. In another example, the predetermined condition can indicate specific words, phrases, etc., and the chat client 142 can send the attention request 150 to each recipient of a new message if the new message contains the specific words, phrases, etc.

In response to receiving the attention request 150 from the user 132 (i.e., from the chat client 142), the chat server application 112 can communicate to the chat client 140 an attention instruction 152 that instructs the chat client 140 to present a specific attention indicator to the user 130. The attention instruction 152 can indicate the first group chat, or the specific message in the first group chat, selected by the user 132.

In response to receiving the attention instruction 152, the chat client 140 can present the specific attention indicator to the user 130 in a manner that draws the attention of the user 130 to the first group chat or the specific message in the first group chat. In this regard, the manner in which the chat client 140 presents the specific attention indicator can be different than the manner in which the chat client 140 presents general attention indicators. By way of example, a general attention indicator presented in response to a new message being received in the first group chat can be presented by presenting the name of the sender of the new message in bold, or presenting text for the subject of the first group chat in bold, or by flashing the subject and/or name. The specific attention indicator, however, can be presented by highlighting the subject of the first group chat, highlighting the name of the sender of the message to which the attention of the user 130 is to be drawn, adding one or more characters (e.g., an exclamation mark) next to the text for the subject of the group chat and/or name of the selected message, or the specific attention indicator can be presented in any other manner that is different than the manner in which the general attention indicator is presented.

In one arrangement, the manner in which the specific attention indicator is presented can be user selectable. For example, at any time the user 130 can access a menu of the chat client 140 which presents various presentation options for the specific attention indicator. Such options can include various manners in which the specific attention indicator may be displayed and/or audibly presented. The user 130 can select one or more of the options from the menu and the chat client 140 can save the selected option(s) as configuration parameters. In response to receiving the attention instruction 152, the chat client 140 can present the specific attention indicator in accordance with the configuration parameters. The user 130 also can configure the manner in which the general attention indicator is presented in a similar way.

The attention instruction 152 can be provided by the chat server application 112 only to the chat client 140. Accordingly, the specific attention indicator requested by the attention instruction 152 need only be presented by the chat client 140 and to the user 130. Thus, other users (e.g., the users 132, 134) participating in the first group chat need not be bothered by the specific attention indicator. Further, the chat client 140 can persist the specific attention indicator until that specific attention indicator is cleared by the user 130. The user can clear the specific attention indicator by selecting a particular menu item, opening the first group chat indicated by the specific attention indicator, opening the message indicated by the specific attention indicator, or the like. In one arrangement, the manner in which the specific attention indicator is cleared can be a user selectable. For example, the user 130 can select a clearing option from a variety of clearing options presented in the previously described menu, and the chat client 140 can save the selected option as a configuration parameter.

Figures 2, 3:
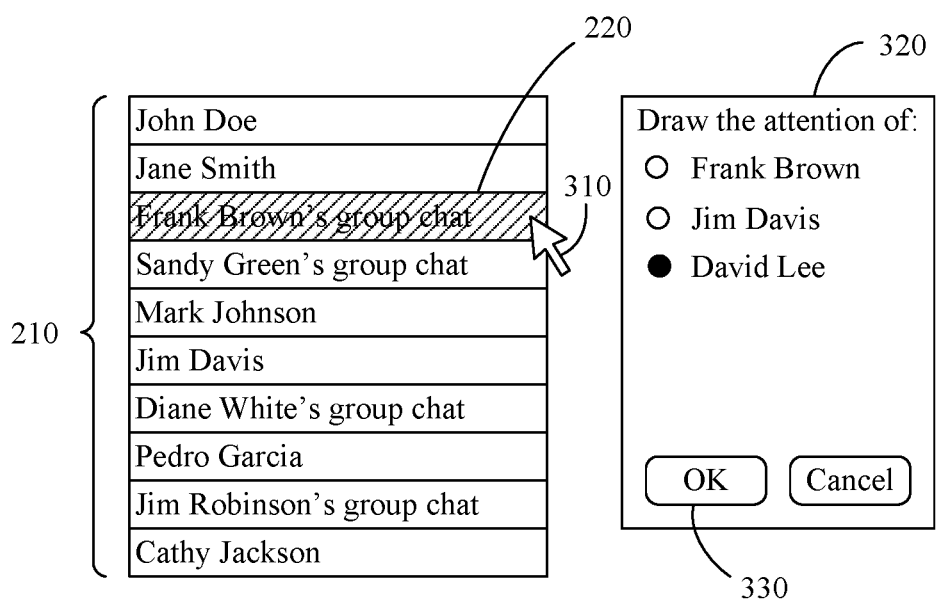
FIG. 2 is a diagram depicting an example view of active chats presented by a user interface of a chat client to a user.
FIG. 3 is another diagram depicting an example view presented by a user interface of a chat client to a user.

FIG. 2 is a diagram depicting an example view 200 of active chats 210 presented by a user interface of a chat client to a user. For instance, the chat client 142 of FIG. 1 can present the view 200 to the user 132. The view 200 can present a plurality of chats 210, including group chats 220, 222, 224, 226 and private chats 230, 232, 234, 236, 238, 240, in which the user 132 is participating.

FIG. 3 is another diagram depicting an example view 300 presented by a user interface of a chat client to a user. For instance, the chat client 142 of FIG. 1 can present the view 200 to the user 132. In this example, in addition to the user 132, users Frank Brown, Jim Davis and David Lee may be participating in the group chat 220. The user 132 may desire or need to draw the attention of David Lee to the group chat 220. To do so, the user can select the group chat 220 using a cursor 310 and initiate the chat client 142 to present a menu 320. For example, the user can right click on the group chat 220 using a mouse or track pad to activate a menu that includes an option selectable by the user 132 to trigger presentation of the menu 320. From the menu 320, the user can choose one or more other users participating in the group chat 220, for instance using one or more radio buttons or the like. In this example, the user 132 may select David Lee, who may be the user 130 of FIG. 1. The user 132 also can select a command represented by a menu item, filed, button, icon or the like, such as a button 330, to confirm the selection. Responsive to the user selecting the icon or button, the chat client 142 can send the attention request 150 described in FIG. 1.

As noted, the user 132 also may select a particular message in the group chat 220 to which to draw the attention of one or more other users. In such case, the user can select the group chat 220 to expand the group chat 220 and initiate the chat client 142 to display the individual messages. The user 132 can select an individual message and enter a user input to initiate the chat client 142 to present the menu 320. From the menu 320, the user 132 can enter one or more user inputs that initiate the chat client 142 to send the attention request 150 as previously described. In another arrangement, the user 132 can open a particular message, and while that message is opened, the user 132 can provide a user input to initiate the chat client 142 to present the menu 320. Again, from the menu 320, the user 132 can enter one or more user inputs that initiate the chat client 142 to send the attention request 150 as previously described.

In another arrangement, the user 132 can select the user 130 from a list of users participating in the group chat 220, and provide one or more user inputs to initiate the chat client 142 to generate the attention request 150 that requests the attention of the user 130 to the group chat 220 or a particular message in the group chat 220. The chat client 142 can process such user input to generate the attention request 150. In yet another arrangement, the user 132 can enter one or more alphanumeric characters into the chat client 142 indicating the user 130 and indicating that the attention of the user 130 to the group chat 220 or a particular message in the group chat 220 is requested or needed. Again, the chat client 142 can process such user input to generate the attention request 150. Still, the chat client 142 can receive any of a myriad of different types of user inputs from the user 132 to initiate the chat client 142 to generate the attention request 150, and the present arrangements are not limited in this regard.

Figure 4:
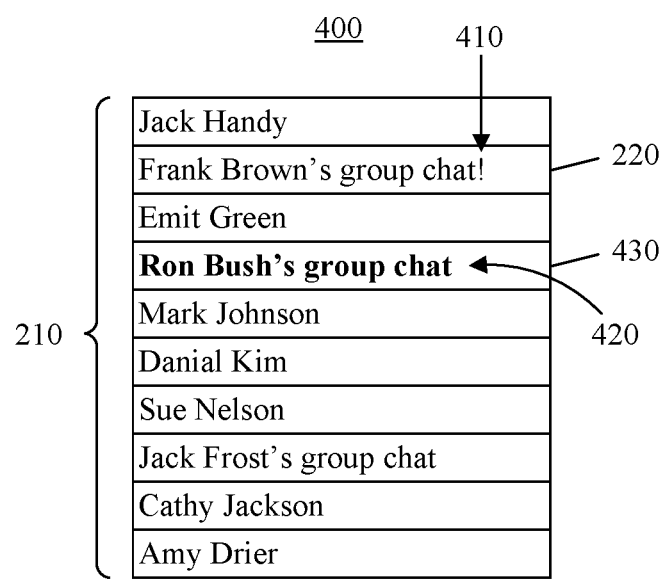
FIG. 4 is another diagram depicting an example view presented by a user interface of a chat client to a user.

FIG. 4 is another diagram depicting an example view 400 presented by a user interface of a chat client to a user. For instance, the chat client 140 of FIG. 1 can present the view 400 to the user 130. In this example, in response to the chat client 140 receiving the attention instruction 152, the chat client 140 can present to the user 130 a specific attention indicator 410. The specific attention indicator 410 can draw the attention of the user 130 to the group chat 220, or a message within the group chat 220, indicated by the attention instruction 152, as previously described.

As noted, the specific attention indicator 410 can be presented in a manner that is different than the manner in which a general attention indicator 420 is presented. In this example, the specific attention indicator can be presented as an exclamation mark presented with a name of the group chat 220. In contrast, the general attention indicator can be presented as a text effect applied to a name of a group chat 430, for example as a bold effect applied to the name. Still the specific attention indicator 410 and the general attention indicator 420 each can be presented in a myriad of different manners, so long as the specific attention indicator 410 and the general attention indicator 420 are not provided in the same manner. The manners in which the specific attention indicator 410 and the general attention indicator 420 are presented can be user configurable, for example by the user 130, as previously described.

FIG. 5 is a flow chart illustrating an example of a method 500 of presenting a specific attention indicator to a user. The method 500 can be performed by the server 110 (e.g., by the chat server application 112).

At step 505, the server 110 can host a plurality of different group chats in which a first user participates, wherein each group chat comprises at least two other users. At step 510, the server 110 can receive a request from a second user of a first of the plurality of group chats for attention of the first user of the first group chat. At step 515, responsive to receiving the request from the second user of the first of the plurality of group chats for attention of the first user of the first group chat, the server 110 can instruct, using a processor, a chat client of the first user of the first group chat to present a first attention indicator for the first group chat by communicating to the chat client an attention instruction, wherein the attention instruction is provided only to, and the first attention indicator is presented only by, the chat client of the first user of the first group chat and persists until cleared by the first user. The first attention indicator instruction is provided only to, and the first attention indicator is presented only by, the chat client of the first user of the first group chat and can persist until cleared by the first user.

Figure 6:
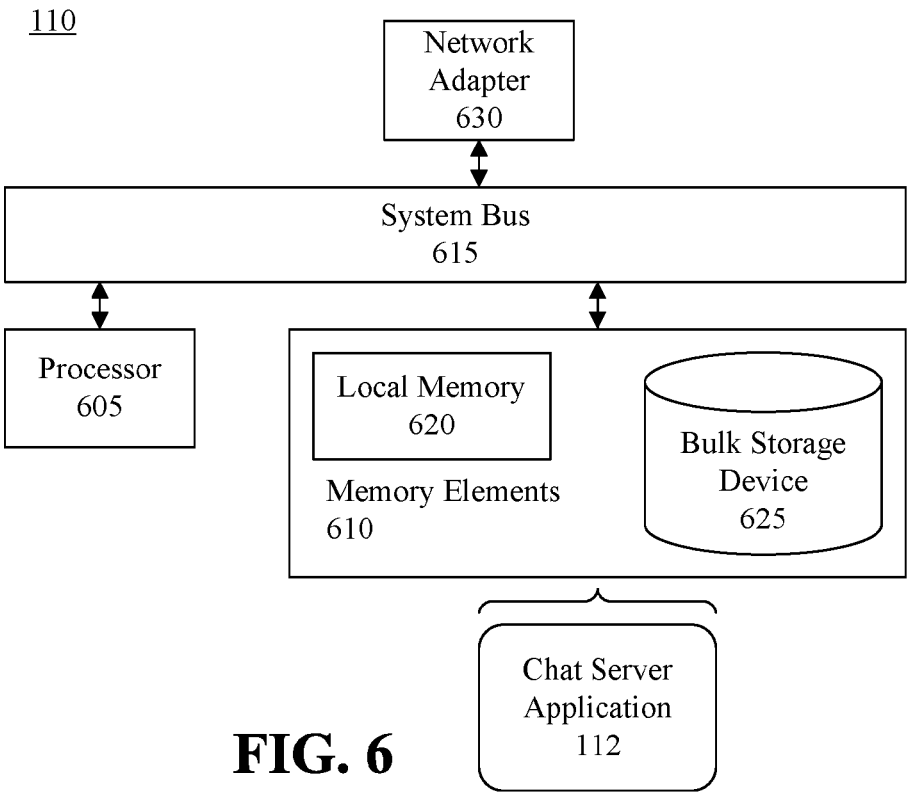
FIG. 6 is a block diagram illustrating example architecture for a server.

FIG. 6 is a block diagram illustrating example architecture for the server 110. The server 110 can include at least one processor 605 (e.g., a central processing unit) coupled to memory elements 610 through a system bus 615 or other suitable circuitry. As such, the server 110 can store program code within the memory elements 610. The processor 605 can execute the program code accessed from the memory elements 610 via the system bus 615. It should be appreciated that the server 110 can be implemented in the form of any system including a processor and memory that is capable of performing the functions and/or operations described within this specification. For example, the server 110 can be implemented as a single processing system or a plurality of communicatively linked processing systems.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The server 110 also can include one or more cache memories (not shown) that provide temporary storage of at least some program code in order to reduce the number of times program code must be retrieved from the bulk storage device 625 during execution.

One or more network adapters 630 also can be coupled to server 110 to enable the server 110 to become coupled to other systems, computer systems, remote printers, and/or remote storage devices through intervening private or public networks. Modems, cable modems, transceivers, and Ethernet cards are examples of different types of network adapters 630 that can be used with the server 110.

As pictured in FIG. 6, the memory elements 610 can store the chat server application 112 of FIG. 1. Being implemented in the form of executable program code, the chat server application 112 can be executed by the server 110 and, as such, can be considered part of the server 110. Moreover, the chat server application 112 is a functional data structure that imparts functionality when employed as part of the server 110.

Figure 7:
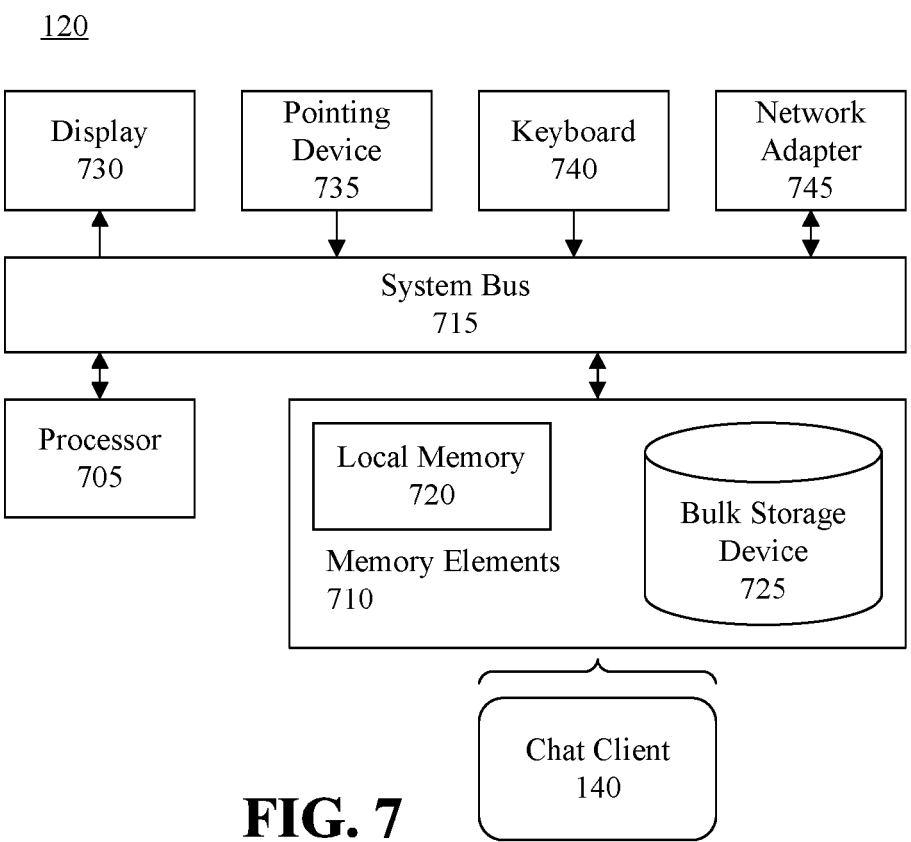
FIG. 7 is a block diagram illustrating example architecture for a client device.

FIG. 7 is a block diagram illustrating example architecture for the client device 120. The client devices 122-128 can be configured in a similar manner.

The client device 120 can include at least one processor 705 (e.g., a central processing unit) coupled to memory elements 710 through a system bus 715 or other suitable circuitry. As such, the client device 120 can store program code within the memory elements 710. The processor 705 can execute the program code accessed from the memory elements 710 via the system bus 715. It should be appreciated that the client device 120 can be implemented in the form of any system including a processor and memory that is capable of performing the functions and/or operations described within this specification.

The memory elements 710 can include one or more physical memory devices such as, for example, local memory 720 and one or more bulk storage devices 725. The client device 120 also can include one or more cache memories (not shown) that provide temporary storage of at least some program code in order to reduce the number of times program code must be retrieved from the bulk storage device 725 during execution.

Input/output (I/O) devices such as a display 730, and, optionally, a pointing device 735 and/or keyboard 740 can be coupled to the client device 120. The I/O devices can be coupled to the client device 120 either directly or through intervening I/O controllers. For example, the display 730 can be coupled to the client device 120 via a graphics processing unit (GPU), which may be a component of the processor 705 or a discrete device. One or more network adapters 745 also can be coupled to client device 120 to enable the client device 120 to become coupled to other systems, computer systems, remote printers, and/or remote storage devices through intervening private or public networks. Modems, cable modems, transceivers, and Ethernet cards are examples of different types of network adapters 745 that can be used with the client device 120.

As pictured in FIG. 7, the memory elements 710 can store the chat client 140. Being implemented in the form of executable program code, the chat client 140 can be executed by the client device 120 and, as such, can be considered part of the client device 120. Moreover, the chat client 140 is functional data structure that imparts functionality when employed as part of the client device 120.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor programmed to initiate executable operations comprising:
    hosting a plurality of different group chats in which a first user participates, wherein each group chat comprises at least two other users;
    receiving from a second user, by a chat client of the second user, at least one user input defining a predetermined condition, the predetermined condition indicating at least one specific word or phrase that, if contained in a new message, triggers presentation of a specific attention indicator to be presented only to a specific user;
    receiving a first new message in a first of the plurality of group chats and receiving a second new message in a second of the plurality of group chats;
    responsive to receiving the first new message in the first group chat, determining whether the first new message satisfies the predetermined condition by containing the at least one specific word or phrase, and responsive to receiving the second new message in the second group chat, determining whether the second new message satisfies the predetermined condition by containing the at least one specific word or phrase;
    responsive to determining that the first new message satisfies the predetermined condition by containing the at least one specific word or phrase, instructing a chat client of the first user of the first group chat to present the specific attention indicator for the first group chat by communicating to the chat client of the first user a first attention instruction, wherein the specific attention indicator signifies that participation of the first user within the first group chat is needed or requested by another user of the first group chat, wherein the first attention instruction is provided only to, and the specific attention indicator is presented only by, the chat client of the first user of the first group chat and persists until cleared by the first user; and responsive to determining that the second new message does not satisfy the predetermined condition due to not containing the at least one specific word or phrase, instructing chat clients of each of the users in the second group chat to present a general attention indicator for the second group chat by communicating to chat clients of each of the users participating in the second group chat a second attention instruction, wherein the general attention indicator signifies that the second new message has been received for the second group chat.

2. The system of claim 1, wherein the first new message is a text-based electronic message.

3. The system of claim 1, wherein the determining whether the first new message contains the at least one specific word or phrase indicated by the predetermined condition comprises performing natural language processing on the first new message.

4. The system of claim 1, the executable operations further comprising:
communicating the first new message to the chat client of the first user of the first group chat.

5. The system of claim 1, wherein a manner in which the specific attention indicator is presented is user configurable.

6. A computer program product comprising a computer readable storage medium having program code stored thereon, the program code executable by a processor to perform a method comprising:
hosting a plurality of different group chats in which a first user participates, wherein each group chat comprises at least two other users;
receiving from a second user, by a chat client of the second user, at least one user input defining a predetermined condition, the predetermined condition indicating at least one specific word or phrase that, if contained in a new message, triggers presentation of a specific attention indicator to be presented only to a specific user;
receiving a first new message in a first of the plurality of group chats and receiving a second new message in a second of the plurality of group chats;
responsive to receiving the first new message in the first group chat, determining, by the processor, whether the first new message satisfies the predetermined condition by containing the at least one specific word or phrase, and responsive to receiving the second new message in the second group chat, determining, by the processor, whether the second new message satisfies the predetermined condition by containing the at least one specific word or phrase;
responsive to determining that the first new message satisfies the predetermined condition by containing the at least one specific word or phrase, instructing a chat client of the first user of the first group chat to present the specific attention indicator for the first group chat by communicating to the chat client of the first user a first attention instruction, wherein the specific attention indicator signifies that participation of the first user within the first group chat is needed or requested by another user of the first group chat, wherein the first attention instruction is provided only to, and the specific attention indicator is presented only by, the chat client of the first user of the first group chat and persists until cleared by the first user; and
responsive to determining that the second new message does not satisfy the predetermined condition due to not containing the at least one specific word or phrase, instructing chat clients of each of the users in the second group chat to present a general attention indicator for the second group chat by communicating to chat clients of each of the users participating in the second group chat a second attention instruction, wherein the general attention indicator signifies that the second new message has been received for the second group chat.

7. The computer program product of claim 6, wherein the first new message is a text-based electronic message.

8. The computer program product of claim 6, wherein the determining whether the first new message contains the at least one specific word or phrase indicated by the predetermined condition comprises performing natural language processing on the first new message.

9. The computer program product of claim 6, the method further comprising:
communicating the first new message to the chat client of the first user of the first group chat.

10. The computer program product of claim 6, wherein a manner in which the specific attention indicator is presented is user configurable.

* * * * *